March 3, 1970     G. H. HOOPER     3,498,264
PROCESS FOR EXTERMINATING PREDATOR MARINE LIFE
Filed March 19, 1968     3 Sheets-Sheet 1
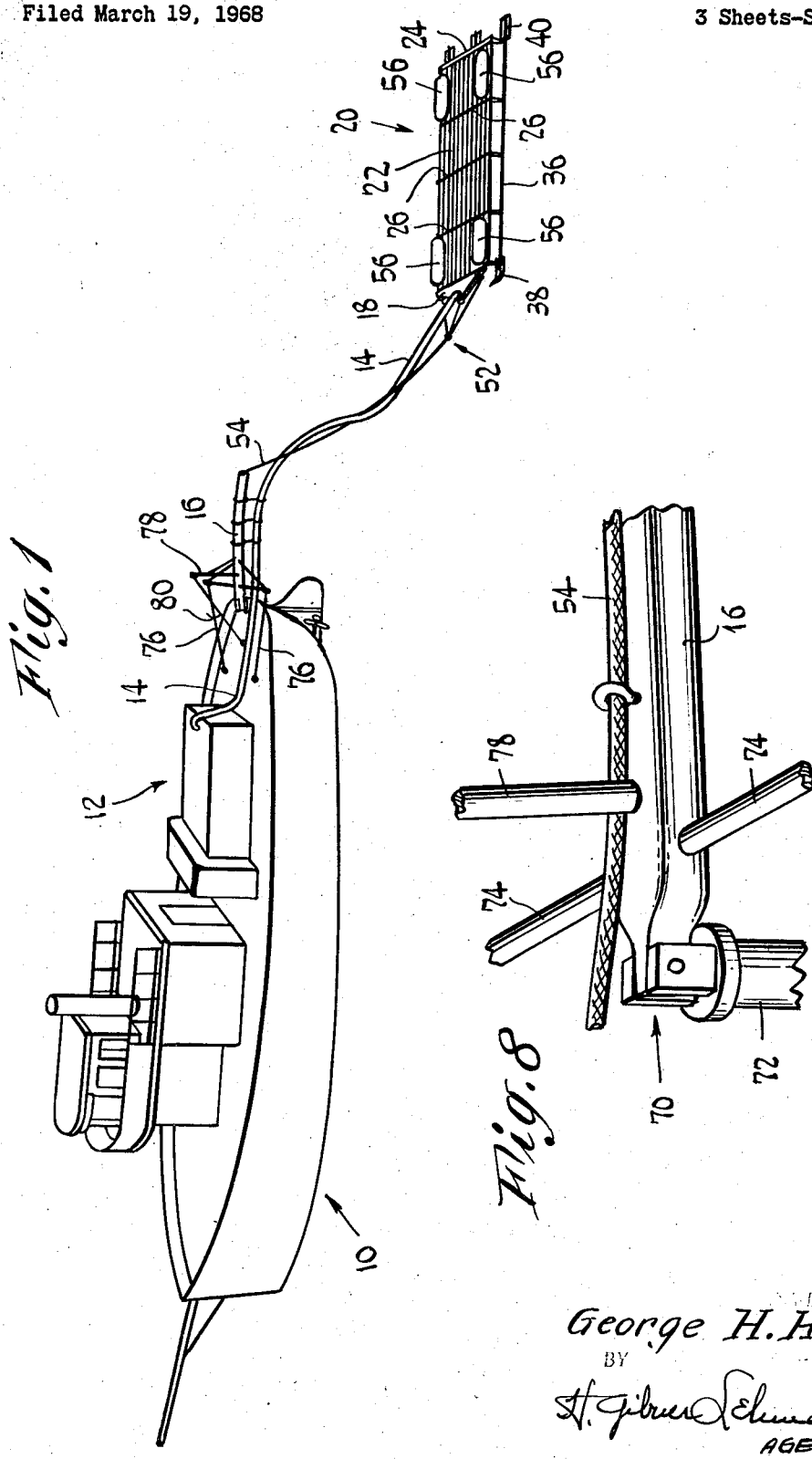
INVENTOR.
George H. Hooper
BY
AGENT March 3, 1970 G. H. HOOPER 3,498,264
PROCESS FOR EXTERMINATING PREDATOR MARINE LIFE
Filed March 19, 1968 3 Sheets-Sheet 2
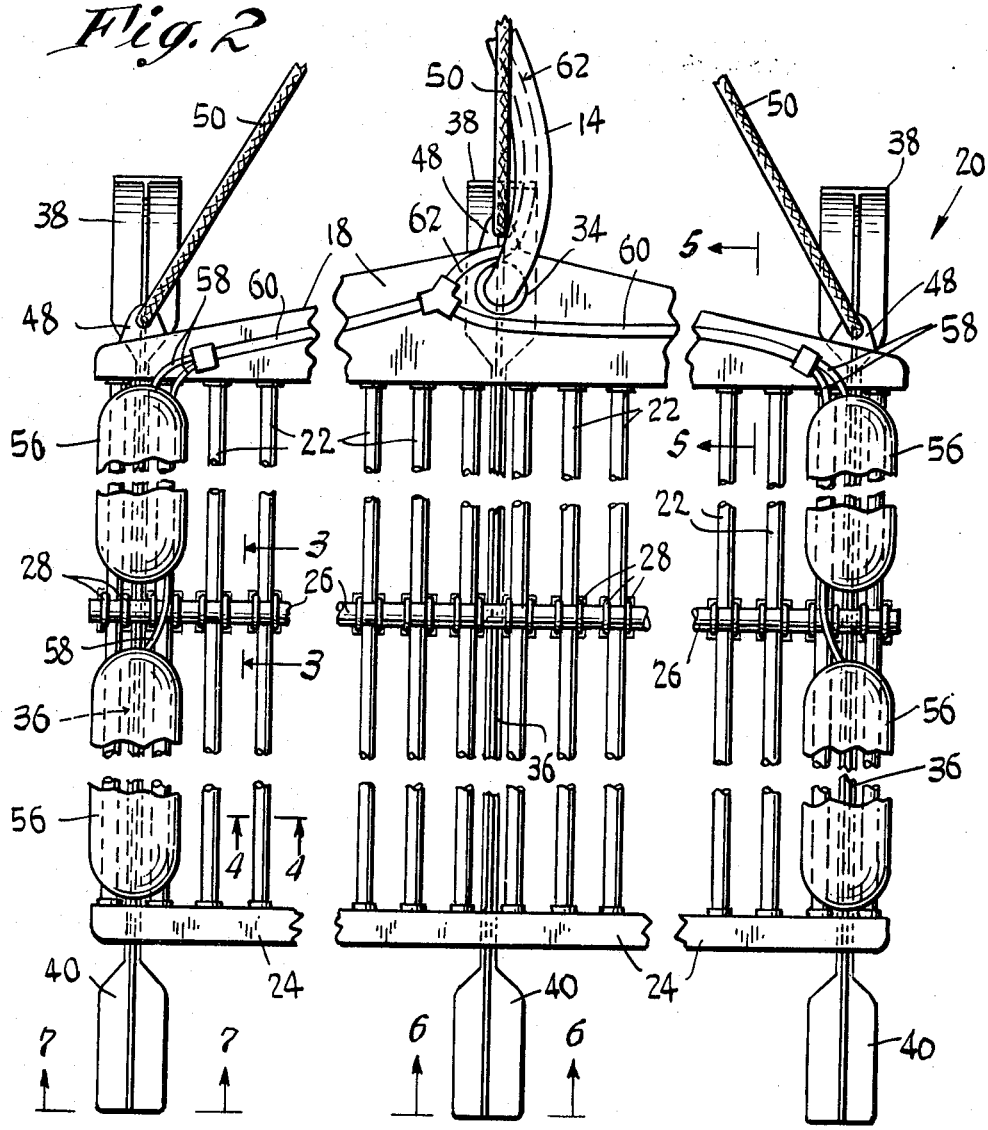
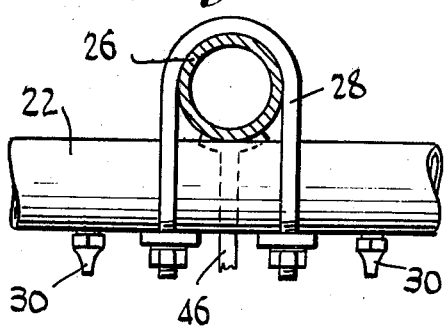
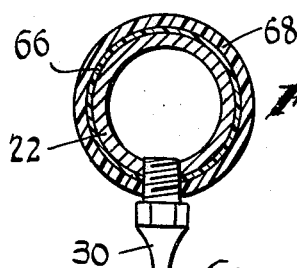
INVENTOR.
George H. Hooper
BY
H. Gilbert Ehmann
AGENT March 3, 1970     G. H. HOOPER     3,498,264
PROCESS FOR EXTERMINATING PREDATOR MARINE LIFE
Filed March 19, 1968     3 Sheets-Sheet 3
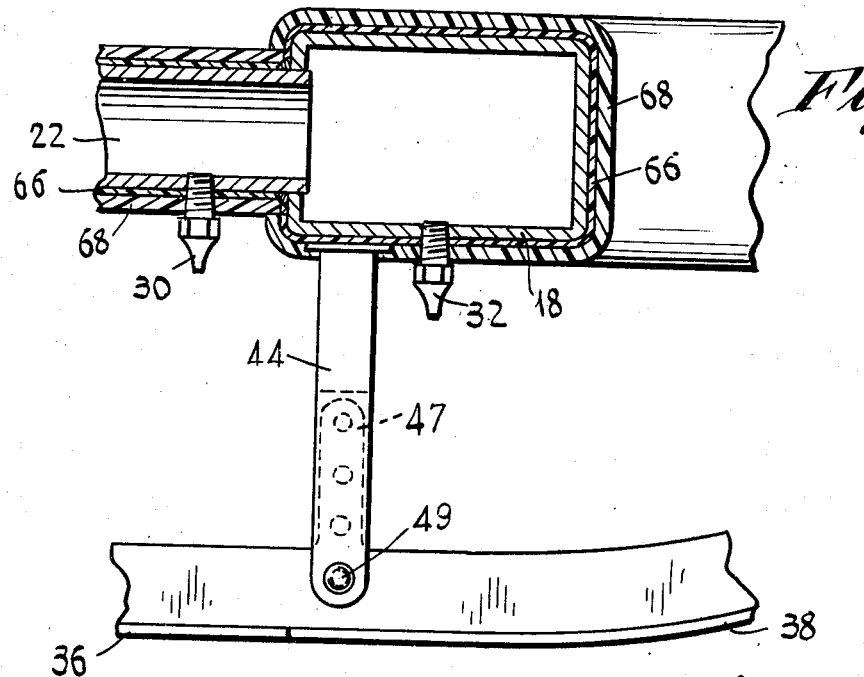
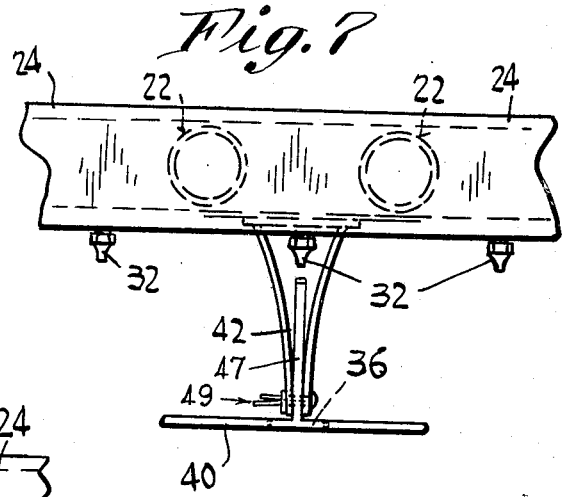
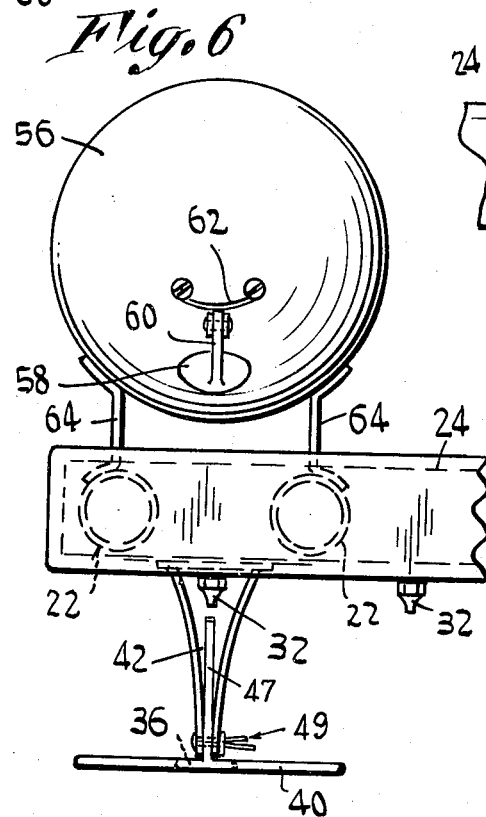
INVENTOR.
George H. Hooper
BY
AGENT

United States Patent Office 3,498,264
Patented Mar. 3, 1970

3,498,264
PROCESS FOR EXTERMINATING PREDATOR MARINE LIFE
George H. Hooper, Bridgeport, Conn., assignor of one-half to Douglas A. Finkelstone, Bridgeport, Conn.
Filed Mar. 19, 1968, Ser. No. 714,260
Int. Cl. A01m 25/00
U.S. Cl. 119—4        5 Claims

ABSTRACT OF THE DISCLOSURE

Extermination of starfish and drills living in an oyster bed by subjecting them to destructive fluids, as for example live steam or chemicals, delivered over large bed areas by multi-nozzle spreader which travels on runners and is hauled and supplied by a boat making runs or passes over the bed.

BACKGROUND

This invention relates to the cultivation and raising of oysters, and more particularly to the protection of oyster beds against predators, especially starfish, drills and the like.

Heretofore it has been proposed to kill starfish and drill predators by use of chemical pesticides or agents introduced into the bed areas. While certain chemicals have been successful in effecting the desired extermination, the effect on the oysters themselves and therefore on the consuming public has presented a difficult problem. It is believed in this connection that the resultant chemical agents found in oysters taken from beds that are so protected might conceivably be harmful to the consumer.

A method currently in use, of ridding oyster beds of starfish involves lowering large mop-like devices formed of plastic strands onto the bed surface to become tangled with the starfish. The mops are then raised with the starfish catch, and lowered into the tubs of steaming hot water which effectively kill the predators. This method is slow and costly, and not effective in clearing all the areas of a bed. Due to its very nature, the method misses many infested spots since it is not continuous in its action and suffers from both intended and unavoidable movement and shifting of the boat.

SUMMARY

The above disadvantages and drawbacks of prior predator-exterminating devices are obviated by the present invention, and one object is to provide a novel and improved oyster and drill predator extermination apparatus and method which are not open to the question of harmful pesticide residue remaining in the oyster, and which more completely and thoroughly clears the oyster beds without as much likelihood of missing or skipping infested areas. This is accomplished by the provision of a novel heat-insulated multi-nozzle fluid distributor or spreader device constituted as a flat structure or grid adapted to travel along the bottom, over the oyster beds, said device being hauled and supplied by a suitably equipped surface vessel or boat. The distributor has floats and runners, and comprises a plurality of nozzle-equipped parallel pipes or tubes, or equivalent fluid distribution means arranged to simultaneously cover a relatively large area of the oyster bed, measured in hundreds of square feet, and to discharge a fluid having the ability to destroy the predator starfish and/or drills. In the illustrated example of the invention such fluid is in the form of superheated steam, although the distributor device can as well handle other types of fluid involving chemicals which might be found effective and safe in use for the desired purpose. The nozzle-equipped means or pipes are fed by a flexible insulated spiral-metal steam line going to a steam generator on the boat, and the distributor itself is transported over the oyster bed by pulling cables attached to the boat by a control and guide mechanism at the stern.

Other objects and features of the invention reside in an improved method and apparatus as above set forth, which are simple, relatively inexpensive, especially effective and reliable, sturdy in construction as to the apparatus, easily serviced and maintained, and further characterized as continuous in nature as distinguished from intermittent procedures.

Other features and advantages will hereinafter appear.

In the drawings:

FIG. 1 is a side perspective view of a bottom-travelling boat-drawn distributor or spreader device as provided by the invention, and of the floating, navigable supply and hauling station and associated equipment to which the distributor is coupled.

FIG. 2 is a top plan view on a greatly reduced scale of the nozzle-equipped, bottom-travelling distributor or spreader device, portions being broken away to facilitate the illustrating of the device.

FIG. 3 is a fragmentary sectional view, taken on the line 3—3 of FIG. 2.

FIG. 4 is a fragmentary sectional view, taken on the line 4—4 of FIG. 2.

FIG. 5 is a fragmentary sectional view, taken on the line 5—5 of FIG. 2.

FIG. 6 is a fragmentary rear elevational view looking in the direction of the arrow 6 of FIG. 2.

FIG. 7 is a fragmentary rear elevational view, looking in the direction of the arrow 7 of FIG. 2.

FIG. 8 is a fragmentary perspective view of the knuckle joint connection between the stern of the supply station or boat and the control boom which is connected to the bottom-travelling distributor device.

As already stated, the illustrated embodiment of the invention embraces the use of super-heated live steam which is directed against the starfish predators and other undesired inhabitants of the oyster beds for the purpose of exterminating such predatory life while not injuring the oyster population.

In FIG. 1 the supply and hauling station is shown as constituted of a boat, being indicated by the numeral 10. The boat 10 is provided with a supply means 12 for an exterminating fluid, which means could be a steam generator or boiler of the kind adapted to provide large quantities of super-heated steam at elevated pressures and temperatures. Or the means 12 could be a mixing tank and pump, each of the foregoing supplies being conventional and well known, and therefore being not shown herein in detail. It will be understood that water and chemicals could be mixed in and pumped from the supply 12, or that steam could be produced by said supply. Assuming the latter, the supply 12 comprises a boiler from which there extends an insulated steam line 14, preferably formed of flexible interlocking metal conduit. The line 14 is carried by a boom 16 and descends in the water at the stern of the boat to a front steam or distributing manifold 18 of a nozzle-equipped distributor device designed generally by the numeral 20. The device 20 is so arranged that it covers a relatively large area of the oyster bed, measured generally in hundreds of square feet. For example, the distributor device 20 may advantageously be on the order of 20 feet wide and 30 feet long. Other sizes and shapes may be utilized as well, without departing from the spirit of the invention.

Referring now to FIGS. 2–7, the distributor device 20 comprises a plurality of parallel heat-insulated steam pipes or tubes 22 which are connected to the header or steam manifold 18 as by welding. The steam pipes 22 may be advantageously on the order of 2 inches in diameter and 30 feet long each, said pipes at their tail ends being connected to a transverse tail manifold 24 and being preferably welded thereto in the same manner employed at the front manifold 18.

Intermediate their ends, the steam pipes 22 are rigidly interconnected by transverse or cross-brace pipes or members 26, one such member being illustrated in FIG. 2 and three such members being shown in FIG. 1. Preferably the cross members 26 are connected to the steam pipes 22 by U-bolts 28, the advantage being had by such connections that there is maintained a maximum degree of strength, not only for the steam pipes 22 but also for the cross brace pipes 26. Also, with such connections there is no likelihood of leakage of the superheated steam or fluid at the bracing points.

At their undersides the steam pipes 22 are provided with multiple steam or fluid nozzles 30, spaced apart any desired distance as for example by a spacing of 12 inches or so. Additionally, the steam manifolds 18 and 24 may be provided with space-apart downwardly directed fluid nozzles 32. By such arrangement a relatively large area, covering hundreds of square feet of the oyster bed, will be subjected to the fluid which is being discharged from the nozzles 30, 32.

The steam line 14 is brought into the front manifold 18 by a suitable detachable fitting 34, and it will be understood that by the above organization super-heated steam from the boiler 12 may be discharged from the multiplicity of nozzles 30, 32 so as to subject the underlying areas of the oyster bed to the action of the live steam. I have found that when starfish predators and other undesired water life are subjected to such superheated live steam for a relatively short interval of time they are effectively exterminated while at the same time no harm is done to the oyster population of the bed.

The time of exposure or subjection can be easily controlled by the speed of travel of the distributor frame or grid 20 along the bottom surface, over the oyster bed. For the purpose of enabling the distributor to travel readily in the desired manner, it is provided with fore-and-aft extending runners 36, extending between the manifolds 18 and 24 and having a relatively narrow configuration at such locations. The runners 36 have widened front or nose portions 38 which are upturned as seen in FIGS. 1 and 5, and have also widened tail portions 40, thereby to provide increased surface areas for supporting the distributor assemblage on the oyster bed while at the same time not interfering with the exposure of the starfish to the discharging steam.

The runners 36 may be adjustably connected by means of brackets 42, 44 respectively to the rear and front manifolds 24, 18, and may also be connected by suitable adjustable brackets 46 on the cross brace pipes 26 as seen in FIG. 3. For this purpose the brackets 42, 44 and 46 may be slotted or bifurcated, and the runners 36 may be provided with upstanding apertured arms 47 adapted to extend into the slots of the brackets and to be connected to the latter by easily removable split pins 49. Thus the distributor frame can be pulled over the oyster bed in a spaced relation thereto which is adjustable to suit different conditions such as shallow or deep depths, warm or cold waters, etc.

For the purpose of hauling or pulling the steam pipe assemblage 20, the front manifold 18 may be provided with eye fittings 48 to which cables 50 are attached, said cables being joined at a juncture 52 from which there extends in a forward and upward direction a main cable 54 passing through a suitable fitting at the end of the boom 16, and passing along the said boom to the deck of the boat 10 where it may extend around a winch or capstan.

To facilitate the handling and manipulation of the distributor device 20, tanks 56 are provided at the four corner portions thereof, said tanks being connected by air lines 58, 60 to a main airline 62 which is preferably lashed to the steam hose 14 and brought to the deck of the boat 10.

The boat has suitable compressed air and vacuum equipment connected to the line 62, by which water may be sucked into the ballast tanks 56 or discharged therefrom, utilizing suitable air flow in the air line. As seen in FIG. 7, the tanks 56 are provided with discharge check valves 58 carried by pivoted arms 60 which are influenced by wire springs 62 in such a manner that the check valves may remain open or else be yieldably held closed under spring pressure. Accordingly, when the ballast tanks 56 are filled with air and the check valves 58 are closed, the distributor frame 20 will float substantially at the top of the surface of the water. When it is desired to submerge the distributor frame 20, the check valves 58 are manually opened, allowing water to enter the ballast tanks 56. By creating a vacuum in the air line 62, the water will more forcibly enter the ballast tanks, and with such tanks full of water the distributor frame 20 will be submerged and resting on the bottom. At such time that the frame is to be raised for repair or towing to another location, the use of compressed air in the air line 62 will effect a discharge of the water from the tanks 56, making the distributor frame buoyant whereby it will come to the surface. The check valves 58 may now be closed manually to prevent re-entrance of the water, so that the distributor frame will stay afloat. The tanks 56 are mounted by suitable brackets 64 carried by the steam pipes 22, as seen in FIG. 6.

Heat insulation of the steam-carrying members of the apparatus, comprising the steam line 14, manifolds 18, 24 and steam pipes 22 may advantageously consist of a Teflon or equivalent high-temperature-resistant plastic skin indicated in the various views by the numeral 66, such Teflon skin being in turn covered by a plastic foam layer 68 also of high-heat-resistant composition.

Some control of the movements of the distributor frame 20 is effected by means of the boom 16, which is carried by a sturdy pivoted knuckle joint 70 on a pivot stud 72 turnable in the deck of the boat 10. The boom 16 has side arms 74 connected to control cables 76 which may be operated by winches or capstans (not shown). The boom 16 has an upstanding arm 78 which is connected by a cable 80 to a capstan or winch (not shown). With such organization, the boom 16 may be raised or lowered or else swung sideways, thereby to steer and control to an extent the distributor frame 20.

By the above organization, the steam feed line 14 will be kept from the rudder and propeller of the boat, as well as enabling a control to be effected of the movements of the frame 20.

The method of the invention is seen to involve the steps of producing an exterminating fluid such as steam or a chemical solution at the supply 12, bringing said fluid down through the hose 14 to the oyster bed, and distributing the fluid simultaneously to a large multiplicity of small areas covering a relatively large surface of the bed, by means of the nozzles 30, 32.

It will now be seen from the foregoing that I have provided a novel and improved method and apparatus for subjecting starfish and drill predators in an oyster bed to an exterminating fluid such as live steam or other suitable fluids (including solutions of chemical substances, either solid or liquid, with liquid vehicles). The method and apparatus are seen to be simple and effective in bringing the fluid into the desired contact with the starfish. The transporting and manipulation of the distributor frame 20 can be effectively accomplished by means of the hauling cables, ballast tanks, and runners, all as illustrated. Live steam is effective against the starfish, whereas a chemical solution can be effective against both starfish and drills.

Variations and modifications are possible, and portions of the improvement may be used without others.

I claim:

1. The method of exterminating predators of oysters on the beds thereof, which includes the steps of producing an exterminating fluid at a point on the surface of the water above the bed, bringing said fluid down from said point through the water to the oyster bed, and distributing said fluid simultaneously to a large multiplicity of small areas covering a relatively large surface of the bed, thereby to effect contact with the predators at said areas for the purpose of destroying the same.

2. The method of claim 1, wherein the producing of the exterminating fluid comprises changing water to steam.

3. The method of claim 2, wherein the steam is converted to superheated steam.

4. The method of claim 2, and including the further step of heat-insulating the steam from the water over the oyster bed as the steam is brought down through said water, thereby to reduce steam condensation.

5. The method of claim 1, and including the further step of shifting the distribution areas along a predetermined substantially straight path over the oyster bed.

References Cited

UNITED STATES PATENTS

| | | | |
|---|---|---|---|
| 2,181,882 | 12/1939 | Flower | 43—124 X |
| 2,672,700 | 3/1954 | Hanks | 37—55 |
| 3,184,866 | 5/1965 | McMillin | 37—55 |
| 3,248,812 | 5/1966 | Gardner | 37—61 |

ALDRICH F. MEDBERY, Primary Examiner

U.S. Cl. X.R.

37—55; 43—124